United States Patent [19]
Anderson

[11] Patent Number: 5,388,172
[45] Date of Patent: Feb. 7, 1995

[54] OPTICAL SWITCHING APPARATUS FOR OPTICAL TIME DOMAIN REFLECTOMETERS

[75] Inventor: Duwayne R. Anderson, Wilsonville, Oreg.

[73] Assignee: Tektroniz, Inc., Wilsonville, Oreg.

[21] Appl. No.: 64,242

[22] Filed: May 20, 1993

[51] Int. Cl.6 ............................................ G02B 6/24
[52] U.S. Cl. ....................... 385/23; 356/73.1; 385/33; 385/40; 385/49
[58] Field of Search ............ 385/14, 16, 23, 24, 385/33, 40, 49; 356/73.1

[56] References Cited

U.S. PATENT DOCUMENTS

| | | | |
|---|---|---|---|
| 4,958,896 | 9/1990 | Brinkmeyer et al. | 359/285 |
| 5,020,872 | 6/1991 | DuPuy et al. | 385/16 |
| 5,046,832 | 9/1991 | Bell | 359/305 |
| 5,048,912 | 9/1991 | Kunikane et al. | 385/23 |
| 5,072,111 | 12/1991 | Gilino | 250/227.15 |
| 5,082,368 | 1/1992 | Fuchs et al. | 356/73.1 |
| 5,104,219 | 4/1992 | Bell | 356/73.1 |
| 5,137,351 | 8/1992 | So | 356/73.1 |

Primary Examiner—Frank Gonzalez
Attorney, Agent, or Firm—William K. Bucher

[57] ABSTRACT

An optical switching apparatus includes a housing having a base and sidewalls with an optical device disposed within the housing for directing optical energy between a first optical waveguides disposed within a first optical passageway formed in the sidewalls and second and third optical waveguides disposed within a second optical passageway formed in the sidewalls. Focusing means, such as collimating lenses, are mounted on the sidewall for focusing the optical energy into the optical waveguides. The optical waveguides are positioned at the focal plane of the respective lenses with the first and second optical waveguides being disposed on the optical axes of their respective collimating lenses. The optical device may be an acousto-optic switch for selectively directing optical energy into the optical passageways. The optical switching apparatus may be used in an optical time domain reflectometer for selectively blocking high amplitude Fresnel reflections from passing through the optical device.

10 Claims, 3 Drawing Sheets

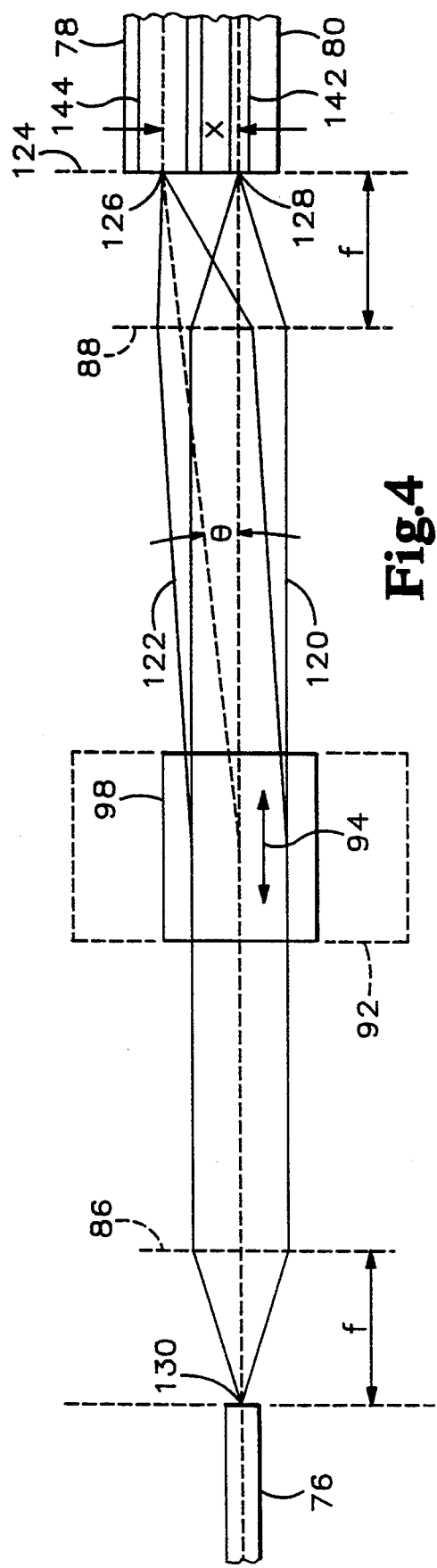
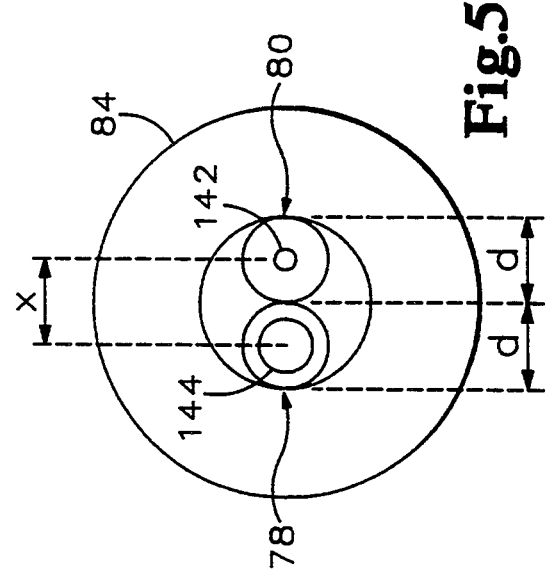

OPTICAL SWITCHING APPARATUS FOR OPTICAL TIME DOMAIN REFLECTOMETERS

BACKGROUND OF THE INVENTION

The present invention relates to optical switching apparatuses and more specifically to acousto-optic switches usable in an optical time domain reflectometer.

Optical time domain reflectometers (OTDR) launch optical pulses, generated by an optical transmitter, into a fiber under test to generate an optical return signal from the test fiber. The return signal includes an exponentially decreasing Rayleigh backscatter signal and possibly high amplitude Fresnel reflections from mechanical splices, connectors, or breaks in the fiber. The return optical signal is coupled to an optical receiver having a photodetector, which converts the optical signal into an electrical signal. The analog electrical signal is converted to digital values by an A/D, processed by a controller, and displayed.

Fresnel reflections in the optical return signal generate diffusion currents in the photodetector, which produce, what is known in the art, as detector tail. The detector tail may mask additional events in the fiber and prevents high resolution two-point measurements with the OTDR. To reduce the effects of large Fresnel reflections and increase the performance of the OTDR, traditional optical couplers have been replaced with optical switches. These switches couple the optical transmitter and optical receiver to the fiber under test and, when properly switched, block Fresnel reflections from the optical receiver. Two types of optical switches are currently being used in OTDR's, acousto-optic switches and electro-optic switches. Acousto-optic switches have an acousto-optic modulator (AOM) made of an acousto-optic material, such as $TeO_2$, $LiNbO_2$, $PbMoO_4$, or the like, which generally has a high figure of merit in at least one crystallographic direction. Applying RF energy to the AOM generates acoustic waves in the material, which affects the path of the light passing through the material.

FIG. 1 shows a representative acousto-optic switch as is used in an OTDR. The acousto-optic switch 8 has an acousto-optic modulator (AOM) 10 and three optical ports 12, 14, and 16 with one port 12 acting as a common port. The common port is optically coupled to the fiber under test via an optical waveguide 18 connected to the front panel (not shown) of the OTDR. Second and third ports 14 and 16 are optically coupled via optical waveguides 20 and 22 to the optical transmitter 24, generally a laser diode, and the photodetector 26, generally an avalanche photodiode (APD). Disposed between each optical waveguide 18, 20, and 22 and the AOM 10 are collimating lenses 28, 30, and 32. These lenses collimate the light going into the AOM 10 and focus the light going into waveguides. An optical prism or fold mirrors 34 is included to redirect one of the light paths coming out of the AOM 10. The optical axes of the lenses 28 and 30 are aligned with transmission axes of the AOM 10 and the transmission axes of the waveguides 18, 20 and 22 are aligned with the respective optical axes of the lenses 28, 30 and 32.

The AOM 10 and the prism or fold mirrors 34 are mounted within a milled metal housing. Holes are drilled in the sides of the housing to allow light to pass into and out of the housing. The collimating lenses 28, 30, and 32 and the waveguides 18, 20 and 22 are mounted in collimating lens assemblies and mounted to the outer side surfaces of the switch housing using screws or other such fasteners. A representative collimating lens assembly 40 is shown in FIG. 2. The lens assembly 40 has a elongate sleeve member 42 axially extending from a base member 44. The sleeve member 42 has an axial bore 46 therethrough for receiving an optical waveguide 48. The base member 44 has a central bore region 50 that receives the collimating lens 52. Apertures 54 are formed in the base member 44 that accept threaded screws for mounting the assembly to the outer surface of the switch housing. Generally, collimating lens assemblies 40 are off the shelf purchased parts that are preassembled and optically aligned by the manufacturer. Precise mechanical and optical alignment of the collimating lens assemblies 40, the modulator 10, and the prism or fold mirrors 34 are required in the assembly of the acousto-optic switch 8.

U.S. Pat. No. 4,958,896 describes an optical multiport element having an acousto-optic modulator where the optical axis of the focusing lenses are aligned to the transmission axis of the acousto-optic modulator and the optical waveguides have their axes spaced from the optical axis of the lenses. The optical waveguides and focusing lenses are mounted in retaining blocks that are adjustably secured to a baseplate by the use of screws or the like. The waveguides and lenses are movable in relation to each other in x-y-z directions. The optical waveguide retaining blocks contain precisely aligned v-grooves that receive the waveguides. The retaining blocks rest on the baseplate and are movable in the x direction relative to the lenses. The retaining blocks for the lenses are movable in both the y and z direction relative to the waveguides.

A major drawback to the above described acousto-optic switches or gates is that the individual optical components are secured in their own mounting receptacles which are then mounted onto a baseplate or housing. Mechanical shock and vibrations can affect the relative alignment of the various optical components causing attenuation or loss of the optical signal. In addition, the various individual mounting receptacles may have different coefficients of thermal expansion causing misalignment of the optical elements due to thermal shock or cycling of the acousto-optic device. Further, the use of mounting receptacles increases the parts count, complexity, and assembly time of the optical switch which increases the cost. Additionally, off axis positioning of the optical waveguides with respect to the optical axis of the focusing lenses reduces the performance of the optical switching apparatus by introducing coma, spherical aberration and the like in the spot size of the focused energy which reduces coupling efficiency.

What is needed is an optical apparatus that overcomes the current limitations of optical switches or gates using individual receptacles for optical components. Ideally, such an apparatus should have all the optical components integrally formed into one housing to lower cost and reduce environmental effects, such as temperature, shake, and shock.

SUMMARY OF THE INVENTION

Accordingly, the present invention is an optical switching apparatus having a housing that includes a base and sidewalls with the sidewalls having apertures formed therein defining optical passageways. An optical device is disposed within the housing for directing optical energy between optical waveguides disposed in the optical passageways. Focusing means are mounted on the housing and disposed across the respective passageways and between the respective optical waveguides and the optical device. An optical passageway may contain more than one optical waveguide with the optical device selectively directing optical energy from the optical waveguide in one passageway to the multiple optical waveguides in the other passageway.

In a further aspect of the present invention, the optical device is an acousto-optic modulator. The focusing means may be first and second collimating lenses having focal lengths defining respective focal planes for focusing the optical energy to a point. Each waveguide has an input port that is positioned in one of the focal planes of the collimating lenses. In the case of multiple waveguides in a single optical passageway, the waveguides are disposed adjacent to each other in the focal plane of the second collimating lens with the separation distance between the waveguides being a function of the focal length of the lens and the divergence angle of the diverging optical paths. In addition, the optical axes of the lenses are aligned on axis with respect to the transmission axis of the acousto-optic modulator and to at least one optical waveguide in each of the optical passageways.

The optical switching apparatus of the present invention is usable in an optical time domain reflectometer (OTDR) as an optical coupler for coupling a fiber under test to the optical transmitter and optical receiver of the OTDR. The objects, advantages and novel features of the present invention are apparent from the following detailed description when read in conjunction with appended claims and attached drawings.

BRIEF DESCRIPTION OF THE DRAWINGS

FIG. 4 is a representation of the optical paths of the optical switching apparatus according to the present invention.

FIG. 5 is an end view of dual side by side optical ports of the optical switching apparatus according to the present invention.

DETAILED DESCRIPTION OF THE PREFERRED EMBODIMENT

Figures 1, 2:
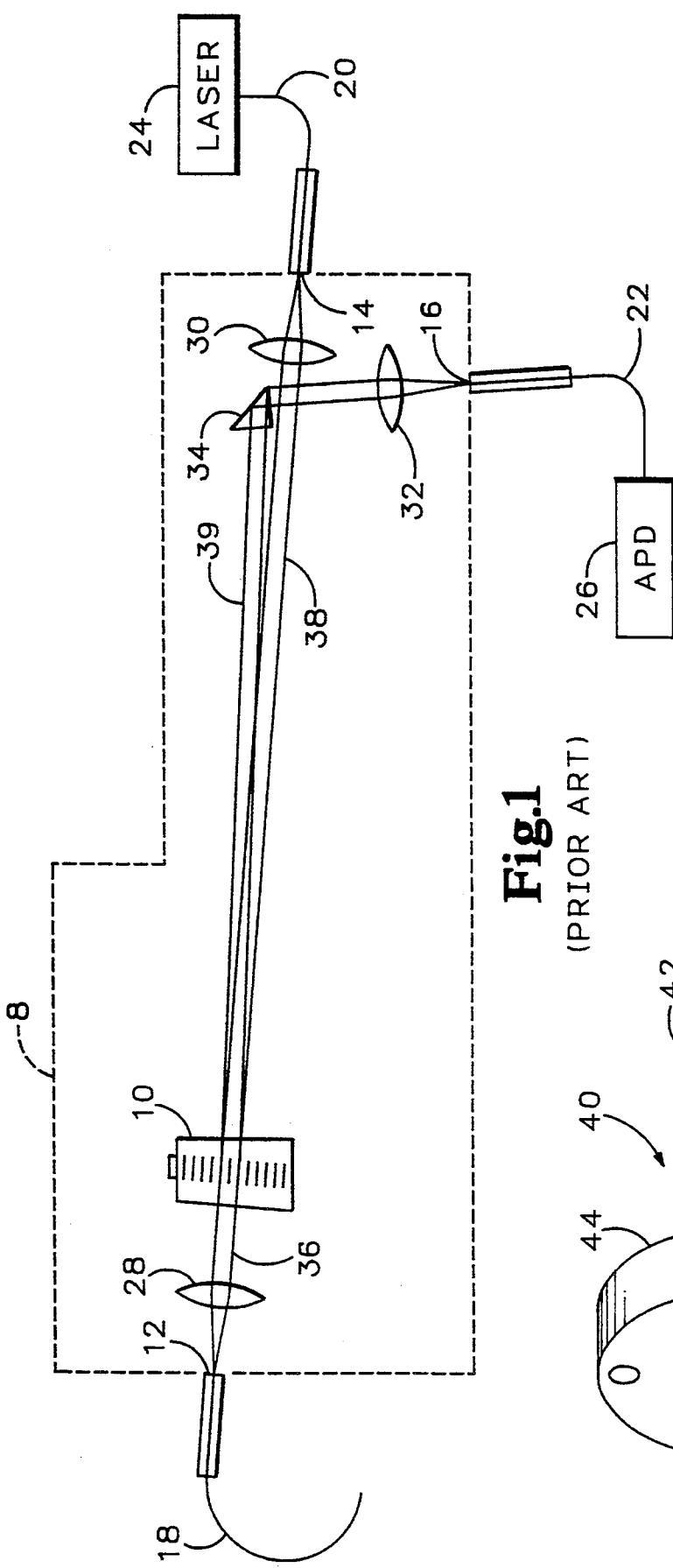
FIG. 1 is a representative optical switching apparatus as used in an optical time domain reflectometer.
FIG. 2 is a representative collimating lens assembly used in the prior art optical switching apparatus.
Figure 3:
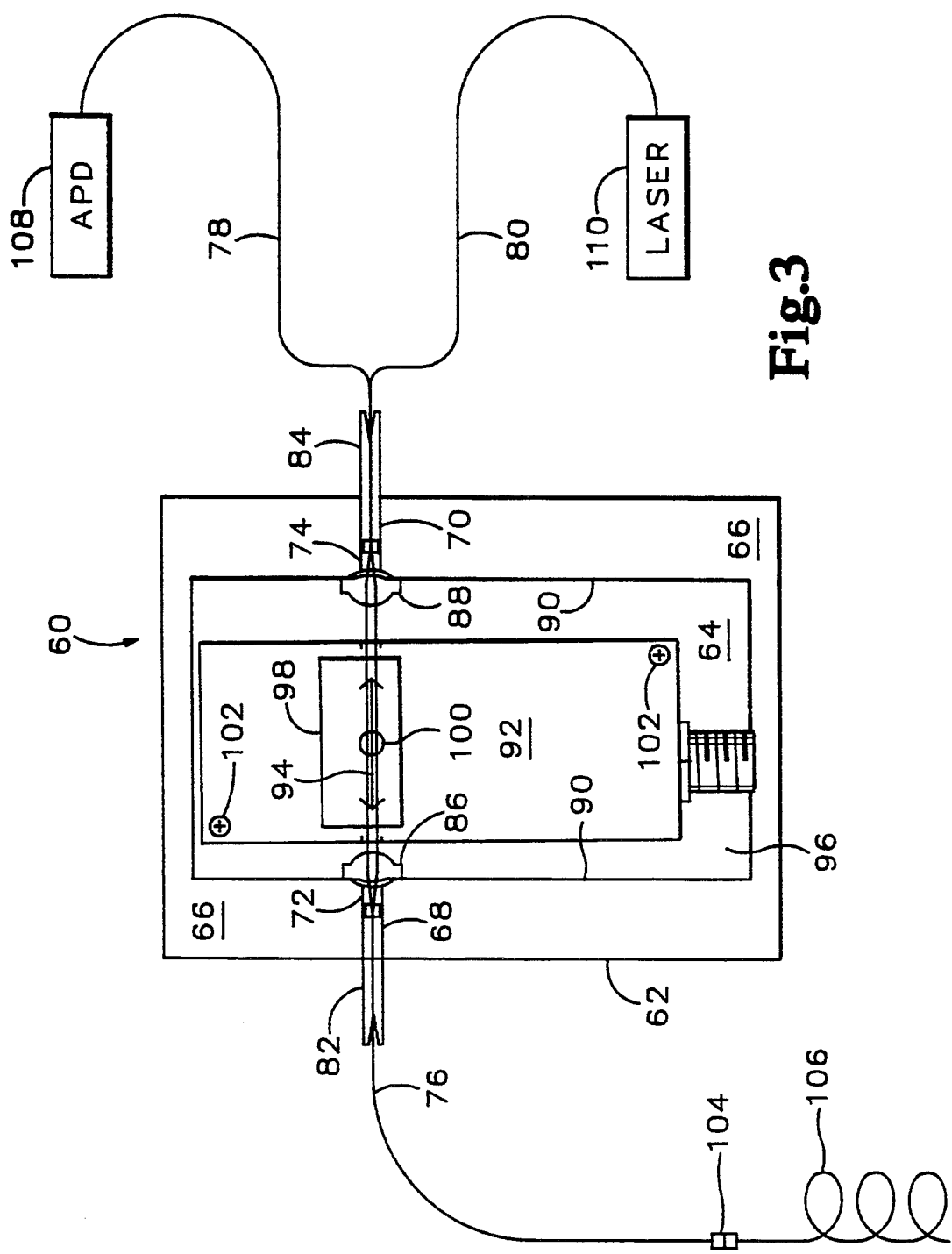
FIG. 3 is a representation of the optical switch apparatus according to the present invention.

Referring to FIG. 3, there is shown the optical switching apparatus 60 according to the present invention. The switching apparatus 60 is similar to prior art apparatus in that it has an optical device for selectively directing optical energy into various optical waveguides. However, instead of mounting the optical components of the apparatus into receptacles and mounting the receptacles on a housing, the present invention uses a monolithic housing as the receptacle for all of the optical components of the switching apparatus. An apparatus of this design is easier and less expensive to manufacture and is less susceptible mechanical shock and vibrations and to alignment variations due to temperature variations.

The optical switching apparatus 60 has a precision housing 62 including a base 64 and sidewalls 66. Apertures 68 and 70 are formed in the sidewalls 66 defining optical passageways 72 and 74. Passageways 72 and 74 receive waveguides 76, 78, and 80. Waveguide 76 is disposed within a ferrule 82 and waveguides 78 and 80 are disposed within a ferrule 84. Collimating lenses 86 and 88 are mounted on the inner surfaces 90 of the sidewalls 66 over the passageways 72 and 74. An optical device 92 is disposed within the housing 62 with its transmission axis 94 aligned with the optical passageways 72 and 74. As is shown in the figure, the housing 62 itself functions as the collimating lens assembly 40 or the retaining blocks of the prior art. This construction, besides reducing the total parts count of the optical apparatus 60, also reduces the size and weight of the apparatus and makes it more stable during thermal cycling, shaking, and shocks.

The precision housing 62 may be made of any suitable material that has stable thermal characteristics and can be formed, cast or milled to precise dimensional tolerances. The well 96 formed by the base 64 and sidewalls 66 contains the optical device 92, which in the preferred embodiment of the optical switching apparatus is an acousto-optic modulator. The acousto-optic modulator 92 has an acousto-optic material 98, such as $TeO_2$, $LiNbO_2$, $PBMoO_4$, or the like, that propagates acoustic waves in the presence of an applied RF signal. The acoustic waves in the acousto-optic material 98 affect the optical path of light passing through the material. A hole 100 on the underside of the AOM 92 mates with a corresponding pin (not shown) in the base 64 to position the transmission axis of the acousto-optic material 98 in line with the optical passageways 72 and 74. Screws 102 secure the AOM 92 in the housing 62 and allow 100 to 200 microns of rotational movement of the AOM 92 around pin 100 for precise optical alignment of the acousto-optic material 98.

Referring to FIG. 4, there is shown a detailed representation of the optical paths of the optical switching apparatus 60. With no RF power applied to the AOM 92, an undiffracted optical energy path 120 exists between waveguides 76 and 80 through collimating lenses 86 and 88 and acousto-optic material 98. In the preferred embodiment the collimating lenses 86 and 88 are aspherical lenses. The optical energy beam emanating from either of the waveguides 76 and 80 is collimated by lenses 86 and 88 and passes through the AOM 92 along the transmission axis 94 of the acousto-optic material 98. The waveguides 76 and 80 and the collimating lenses 86 and 88 in the undiffracted path 120 are aligned so that the optical energy beam passes through the lenses 86 and 88 along their respective optical axis. This configuration maximizes coupling efficiency by minimizing such things as coma, spherical aberrations and the like. With RF power applied, a portion of the optical energy beam is diffracted along the second optical path 122. The angular divergence of the undiffracted and diffracted beam paths is known in the art as twice the Bragg angle of the optical modulator. The present invention takes advantage of the optical property of collimating lenses as represented by the equation $$x = f\theta$$

where f is the focal length of the lens, $\theta$ is the angular separation of undiffracted 120 and diffracted 122 optical beam paths in radians of the acousto-optic modulator 92, and x is the spacial separation between the beams at the focal plane 124 of collimating lens 88. The collimating lens 88 separates the two beams at the focal point of the lens and focuses them into two distinct points 126 and 128 on the focal plane 124 of the lens.

When used in an optical time domain reflectometer (OTDR) waveguide 76 is optically coupled to an optical fiber under test 106 via front panel connector 104. Waveguide 78 is optically coupled to a photodetector 108, such as an avalanche photodiode (APD), that is part of the optical receiver of the OTDR. Waveguide 80 is optically coupled to a laser diode 110, which is the optical energy source or transmitter of the OTDR. An optical pulse is generated by the laser 110 and launched into waveguide 80. The optical pulse enters the optical switching apparatus 60 at port 128 and passes through the collimating lens 88. The collimated optical pulse is optically coupled into the optical modulator 60 along undiffracted optical path 120. With the modulator 60 off, i.e. no RF signal is applied to the modulator, the optical pulse is coupled along the undiffracted optical path 120 to the collimating lens 86. Lens 86 focuses the optical energy into the waveguide 76 at optical port 130. The optical pulse is coupled through the waveguide 76 into the fiber under test 106 via the front panel connector 104.

The return optical energy from the fiber under test 106 is coupled into the optical switching apparatus 60 via waveguide 76. The return optical energy includes a Rayleigh backscatter level and possibly high amplitude Fresnel reflections. The return energy is formed into a collimated beam by lens 86 and coupled into the modulator 60. The optical modulator 60 is turned on, i.e. an RF signal is applied to the modulator, which diffracts a portion of the return optical energy into optical path 122. The diffracted beam passes through the collimating lens 88 and is focused into the waveguide 78 at port 126. The return optical energy is coupled through waveguide 78 to the APD 108. When a Fresnel reflection is detected in the return optical signal from the fiber under test 106, the optical modulator 60 may be selectively turned off to direct the large optical pulse away from the APD 108 optical path 122. This prevents the Fresnel reflection from reaching the APD 108 and producing diffusion currents in the APD, which shows up as detector tail in a displayed output of the return optical energy.

FIG. 5 shows an end view of the optical passageway 74 containing optical waveguides 78 and 80. Optical waveguide 78 is a 50 micron optical fiber and optical waveguide 80 is a 9 micron fiber. Both fibers having a cladding diameter d of 125 microns. The optical fiber 78 and 80 are positioned side by side in ferrule 84 having twice the diameter of the fibers. This sets the distance x between the center of the fiber cores 142 and 144 at 125 microns. The Bragg angle $\theta/2$ of the optical modulator 60 and the focal length f of the collimating lens 88 are selected to produce the needed 125 micron separation x of the focused beam at ports 126 and 128 in the focal plane 124 of the lens 88. Overlap between the undiffracted and diffracted beam paths 120 and 122 at the collimating lens 88 has no effect on the performance of the optical switching apparatus 60 because the lens 88 separates the two beams at the focal plane 124. The fibers 78 and 80 are secured in the ferrule 84 using UV cured epoxy after which the assembly is ground and polished. Likewise, optical fiber 76 is secured in a ferrule 82 using UV cured epoxy after which it is ground and polished.

Active alignment is used in the final assembly of the optical switching apparatus 60. A fixturing device is used to hold the housing 62, lenses 86 and 88, and the optical waveguides 76, 78 and 80 in ferrules 82 and 84. An optical signal from an optical energy source is coupled to either of the fibers 76 and 80 in the undiffracted path 120. The ferrules 82 and 84 are moved in a Z direction, i.e. in and out of the optical passageways 68 and 70, to collimate the optical beam. The collimating lenses are moved in an X and Y direction, i.e. normal to the optical passageways 68 and 70, to point the collimated beam (angular adjustment). The optical output from the optical switching apparatus 60 is monitored for maximum coupling efficiency of the optical signal. When all the parts are aligned, the acousto-optic modulator 92 is secured using screws 102 and the ferrules 82 and 84 and the collimating lenses 86 and 88 are secured to the housing 62 using UV cured epoxy.

A monolithic optical switching apparatus has been described wherein the components of the apparatus are integrally formed in a housing containing an acousto-optic switch. The acousto-optic switch has a transmission axis that is aligned with optical passageways formed in the sidewalls of the housing. One of the optical passageways contains a first optical waveguide and the other contains two waveguides. Collimating lenses are disposed over the passageways for focusing optical energy into the waveguides, which are disposed in the focal plane of the lenses. The acousto-optic switch has an undiffracted optical path that is aligned with the optical axis of the lenses. At least one of the waveguides in the double waveguide optical passageway and the optical waveguide in the other passageway are aligned with the optical axis of the collimating lenses. The waveguides and the lenses are secured to the housing using UV cured epoxy. Such an optical switching apparatus is usable in an OTDR for coupling optical pulses from a laser into a fiber under test and for coupling a return optical signal to a photodetector. The switching apparatus is selectively turned on and off for blocking high amplitude pulses in the return signal from the photodetector. These and other aspects of the present invention are set forth in the appended claims.

What is claimed is:

1. An optical switching apparatus comprising:

a housing having a base and opposing sidewalls with the opposing sidewalls having respective first and second aperture formed therein defining first and second optical passageways with the first optical passageway having a first optical waveguide secured therein and the second optical passageway having second and third optical waveguides secured therein;

an optical device disposed within the housing between the first and second optical passageways for selectively directing optical energy between the first optical waveguide and the second and third optical waveguides, the optical device having a first optical path coupling the optical energy between the first and second optical waveguides and a second optical path diverging from the first optical path to the third optical waveguide for coupling the optical energy between the first and third optical waveguides;

a first optical focusing element mounted on one of the opposing sidewalls and disposed across the first optical passageway for focusing the optical energy into the first optical waveguide; and a second optical focusing element mounted on the other opposing sidewall and disposed across the second passageway for focusing the optical energy into the second and third optical waveguides.

2. The optical apparatus as recited in claim 1 wherein the optical device is an acousto-optic modulator disposed between the first and second optical passageways.

3. The optical apparatus as recited in claim 1 wherein the first and second optical focusing elements comprise collimating lenses with each lens having an optical axis and a focal length defining a focal plane normal to the optical axis for focusing the optical energy to a point.

4. The optical apparatus as recited in claim 3 wherein the optical waveguides have respective input ports for receiving the focused optical energy with the input ports being positioned at the focal plane of the collimating lenses and the first and second input-ports being on the optical axis of the collimating lenses.

5. The optical switching apparatus as recited in claim 4 wherein the second and third optical waveguides are disposed adjacent to each other in the focal plane of the second collimating lens with the separation distance between the waveguides being a function of the focal length of the lens and the diverging optical paths.

6. The optical apparatus as recited in claim 3 wherein the collimating lenses are aspherical lenses.

7. An optical time domain reflectometer having an optical energy source for launching optical energy pulses into an optical fiber under test, an optical receiver for receiving return optical energy from the optical fiber under test and an optical switching apparatus for directing the optical energy pulses into the fiber under test and selectively directing the return optical energy to the optical receiver comprising:

a housing having a base and opposing sidewalls with the opposing sidewalls having respective first and second aperture formed therein defining first and second optical passageways with the first optical passageway having a first optical waveguide secured therein and optically coupled to the fiber under test and the second optical passageway having second and third optical waveguides secured therein and respectively coupled to the optical energy source and the optical receiver;

an acousto-optical modulator disposed within the housing between the first and second optical passageways having a first optical path for directing the optical energy pulses from the second optical waveguide into the first optical waveguide and a second optical path diverging from the first optical path to the third optical waveguide for selectively directing the return optical energy from the first optical waveguide into the third optical waveguide,;

a first collimating lens mounted on one of the opposing sidewalls and disposed across the first optical passageway for focusing the optical energy into the first optical waveguide; and a second collimating lens mounted on the other opposing sidewall and disposed across the second passageway for focusing the optical energy into the second and third optical waveguides.

8. The optical time domain reflectometer as recited in claim 7 wherein the first and second collimating lenses each have an optical axis and a focai length defining a focal plane normal to the optical axis for focusing the optical energy to a point.

9. The optical apparatus as recited in claim 8 wherein the optical waveguides have respective input ports for receiving the focused optical energy with the input ports being positioned at the focal plane of the collimating lenses and the first and second input ports being on the optical axis of the collimating lenses.

10. The optical switch apparatus as recited in claim 7 wherein the collimating lenses are aspherical lenses.

* * * * *